United States Patent
Huang et al.

(10) Patent No.: US 9,568,302 B2
(45) Date of Patent: Feb. 14, 2017

(54) CONCENTRIC CIRCLE ADJUSTING APPARATUS FOR MULTIPLE IMAGE CAPTURING DEVICE

(71) Applicant: NATIONAL APPLIED RESEARCH LABORATORIES, Taipei (TW)

(72) Inventors: Chi-Hung Huang, Taipei (TW); Yung-Hsiang Chen, Taipei (TW); Wei-Chung Wang, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 215 days.

(21) Appl. No.: 14/656,727

(22) Filed: Mar. 13, 2015

(65) Prior Publication Data
US 2016/0269649 A1    Sep. 15, 2016

(51) Int. Cl.
*H04N 7/00* (2011.01)
*G01B 11/00* (2006.01)
*G01B 9/00* (2006.01)

(52) U.S. Cl.
CPC ............... *G01B 11/00* (2013.01); *G01B 9/00* (2013.01)

(58) Field of Classification Search
CPC ........... G06T 7/002; G06T 2207/10012; H04N 13/0246; H04N 13/0242; G01B 11/16; G01B 2210/52
See application file for complete search history.

(56) References Cited

U.S. PATENT DOCUMENTS

| 2013/0070048 | A1* | 3/2013 | Huang | H04N 13/0242 348/36 |
| 2013/0335532 | A1* | 12/2013 | Tanaka | G01B 11/00 348/47 |
| 2015/0282714 | A1* | 10/2015 | Mueller | H04N 5/225 348/37 |

* cited by examiner

*Primary Examiner* — Sath V Perungavoor
*Assistant Examiner* — Puneet Dhillon
(74) *Attorney, Agent, or Firm* — Chih Feng Yeh; Huntington IP Counsulting Co., Ltd.

(57) ABSTRACT

A concentric circle adjusting apparatus for a multiple image capturing device is disclosed, where a first and second correction angles for correcting a first and second image capturing devices are respectively calculated by a control device according to a link length of a standard link, a first angle, a second angle, a first distance, and a second distance, respectively, so that a first and second platforms are controlled according to the first and second control commands to rotate the first and second image capturing device by the first and second correction angles, respectively, whereby the efficacy of an increased visible range and a rapid calibration may be achieved.

10 Claims, 7 Drawing Sheets

CONCENTRIC CIRCLE ADJUSTING APPARATUS FOR MULTIPLE IMAGE CAPTURING DEVICE

BACKGROUND OF RELATED ART

Technical Field

The present invention relates to an adjusting apparatus, and particularly to a concentric circle adjusting apparatus for a multiple image capturing device.

Related Art

Displacement measurement is an important task in structure monitoring, and also one of references for safety evaluation. How to rapidly and conveniently measure a deformity of a structure body is a goal in the engineering field. In terms of the measure mechanism, the displacement measurement may include two types: contact and non-contact types. For the contact type, a displacement gauge has to find a stationary point in a displacement direction of the structure and the measurement instrument is disposed at the stationary point. Thereafter, the measurement instrument is directly fixed onto a measure point of the structure by using a probe, or a steel wire. Then, a relative movement between the structure and the stationary point is calculated by using a position variation of the probe, or other conversion parameters. How to find a proper stationary point in situ for disposing the measure instrument is a to-be-solved issue in the contact type. In addition, the measure instrument has to be in a contact connection with the measure point, imposing an additional limitation on this measurement policy.

The non-contact type measurement is usually conducted by the optical principle. Generally, an optical signal source, such as a laser, a LED, a camera, or other particular optical equipment, is disposed on the measure point. Then, an optical source detection or a signal reception manner is employed to measure a position of a marking point, by which a relative displacement is calculated. The detector employed in the non-contact measurement is similar to that used in the contact type, it has to be disposed on a stationary point. However, the instrument has not to be connected to the measure point, largely reducing a limitation on the disposition position and a requirement of labor force and time for the employment. Furthermore, this type may be applied onto a remote displacement measurement and has a higher freedom in use, and is thus more appreciable in the engineering field.

Further, since cameras have been rapidly developed in their technical level and thus have the greatly increased resolution, and thus may be applied onto the measurement field for up to a certain extent. Along with the use of image analysis software, the non-contact and remote displacement measurement may become possible. In essence, the digital photographing measurement positions particular marking points of the measured position in the image, and the marking points at different time are compared, by which the displacement of the measured point may be deduced. Although the laser detection-based measurement method is equipped with the advantage of the remote measurement, the laser light diverges or presents an in-situ instable light source, which may possibly present an inestimable error and adversely affect the measurement precision. For the camera measurement, as long as the marking point is clear enough in the image, a good measurement result may be anticipated. This image analysis manner not only has the advantage of the non-contact measurement method, the in-situ environment effect on the measurement may be very limited. For this reason, this camera measurement is applied onto a rapid measurement technology for structure deformity in this patent application.

In 3D visual applications, two images taken from different positions are generally adopted, and a relative depth of the whole field scene may be reconstructed from a 2D image. Presently, products for measuring the structure deformity by using the non-contact image manner based on the image applications may be found such as the VIC 3D product released by Correlated Solutions. Now referring to FIG. 1, a prior art image measurement device is schematically shown therein. This image measurement device is composed by a frame 91 and two image capturing device 92, which constitute jointly a measure body with a 3D visual presentation, which may measure a surface deformity of a whole domain of an article. In this technology, the object's surface feature is taken as an object for determining and comparing the surface displacement. Further, the camera image capturing and the image relation algorithm are combined, so that the measurement for the 3D surface deformity may be completed in the shortest time, and the optimal resolution may be obtained. Any minute surface deformity may be presented on the data and image, and the displacement and deformity of a single dot or the surface may be realized.

However, this product requires two image capturing devices 92 for the measurement. When the measured range goes beyond what the two image capturing devices 92 may reach, only a local image may be observed and some shaded areas of the article may not be measured. Further, the camera's posture has to be adjusted with respect to different articles, and the image capturing device has to be calibrated again.

To solve the above problem, TW patent 1442167 has set forth a moving device, which moves along a measure link having a semi-arc shape. A position control device is used to control the moving device to move and position along the measure link. Then, the control device is rotated to control an image capturing angle of a second image capturing device fixed on a rotation device. In this manner, the first and second image capturing devices may present in a concrete circle arrangement. Further, a central optical axis of the first and second image capturing devices crosses at a concrete circle center. As such, a visible range of the image capturing device may be increased. In addition, according to the moved position positioning and the image capturing angle positioning, the image capturing device may rapidly calibrated. Therefore, the limited visible range and the incessant calibration issues of the image capturing devices may be effectively solved. Based on the above patent, this patent application is set forth to make an improvement, so that the visible range of the image capturing devices may be promoted to a more satisfactory extent.

In view of the above, it may be known that there has long been the issues of the limited range and incessant calibration of the image capturing devices. Therefore, there is quite a need to set forth an improvement means to settle down this problem.

SUMMARY

In view of the issues of the limited range and incessant calibration of the image capturing devices, the present invention discloses a concentric circle adjusting apparatus for a multiple image capturing device, which comprises a standard link; a first moving link, pivotally connected to a first end of the standard link through a first pivot; a second moving link, pivotally connected to a second end of the standard link through a second pivot; a standard image capturing device, fixed at a central position of the standard link; a first image capturing device, disposed on the first moving link through a first platform; a second image capturing device, disposed on the second moving link through a second platform; a plurality of measuring units, disposed at a proper position of the first pivot, the second pivot, the first platform and the second platform, respectively, to measure a first angle between the first moving link and the standard link, a second angle between the second moving link and the standard link, a first distance between a position of the first image capturing device at the first moving link and the first pivot, and a second distance between a position of the second image capturing device at the second moving link and the second pivot; and a controlling device, connected to the measuring unit, the first platform and the second platform, respectively, and further comprising a receiving module, receiving the first angle, the second angle, the first distance and the second distance from the measuring unit, respectively; a calculation module, calculating a first correction angle for correcting the first image capturing device and a second correction angle for correcting the second image capturing device according to a length of the standard link, the first angle, the second angle, the first distance, and the second distance; a command generating module, generating a first control command according to the first correction angle, and generating a second control command according to the second correction angle; and a transmitting module, transmitting the first control command to the first platform, and transmitting the second control command to the second platform, wherein the first platform is controlled according to the first control command to enable the first image capturing device to rotate according to the first correction angle, and the second platform is controlled according to the second control command to enable the second image capturing device to rotate according to the second correction angle, so that the standard image capturing device, the first image capturing device and the second image capturing device present in a concentric circle arrangement, and a central optical axis of the standard image capturing device, the first image capturing device and the second image capturing device cross at a circle center of a concentric circle.

The apparatus of the present invention has the difference as compared to the prior art that the first moving link is pivotally connected to the first end of the standard link through the first pivot, the second moving link is pivotally connected to the second end of the standard link through the second pivot, the standard image capturing device is fixed at the central position of the standard link, the first image capturing device is disposed on the first moving link through the first platform, the second image capturing device is disposed on the second moving link through the second platform, the first and second correction angles for correcting the first and second image capturing devices are respectively calculated by the control device according to the link length of the standard link, the first angle, the second angle, the first distance, and the second distance, respectively, so that the first and second platforms are controlled according to the first and second control commands to rotate the first and second image capturing device by the first and second correction angles, respectively, whereby the standard image capturing device, the first image capturing device and the second image capturing device present in the concentric circle arrangement, and the central optical axis of the standard image capturing device, the first image capturing device and the second image capturing device cross at a circle center of a concentric circle.

By using of the above technical means, the present invention may achieve the efficacy of a visible range and a rapid calibration of the image capturing device.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

Figure 1:
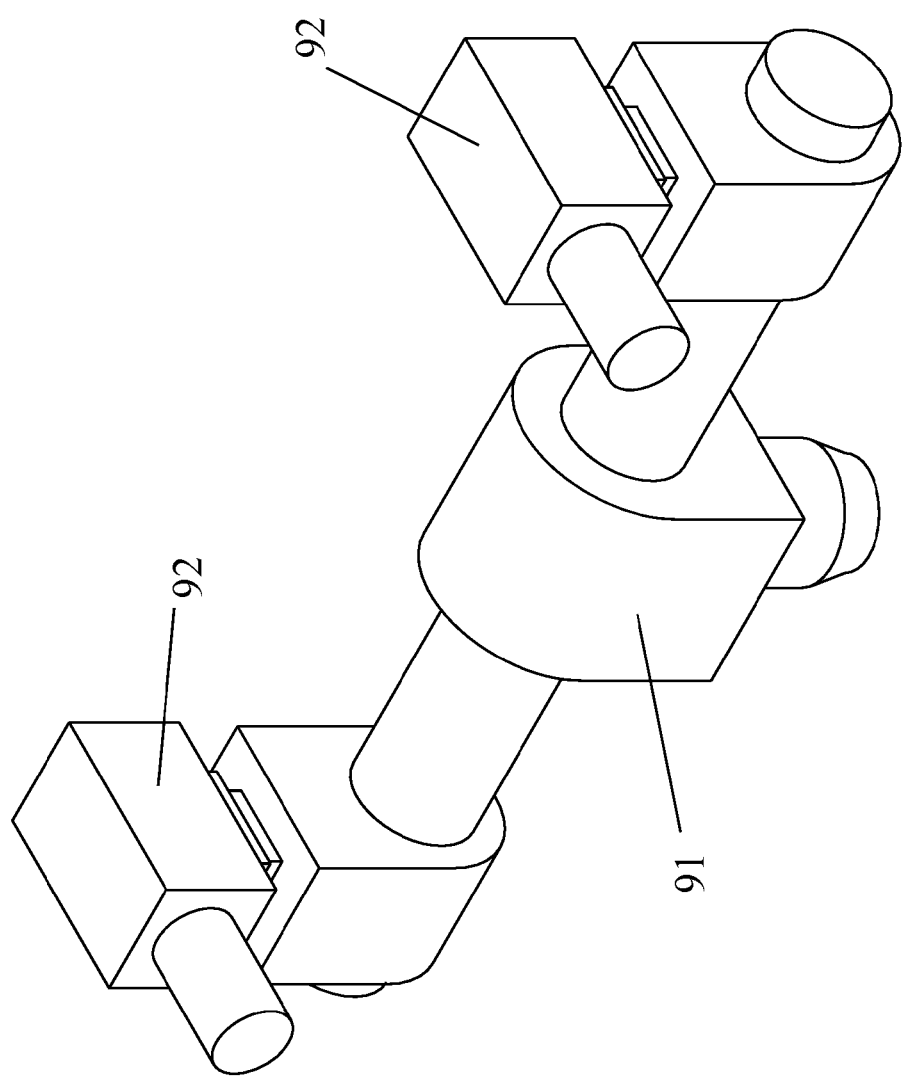
FIG. 1 is a schematic diagram of a prior art image measuring device.
Figure 2:
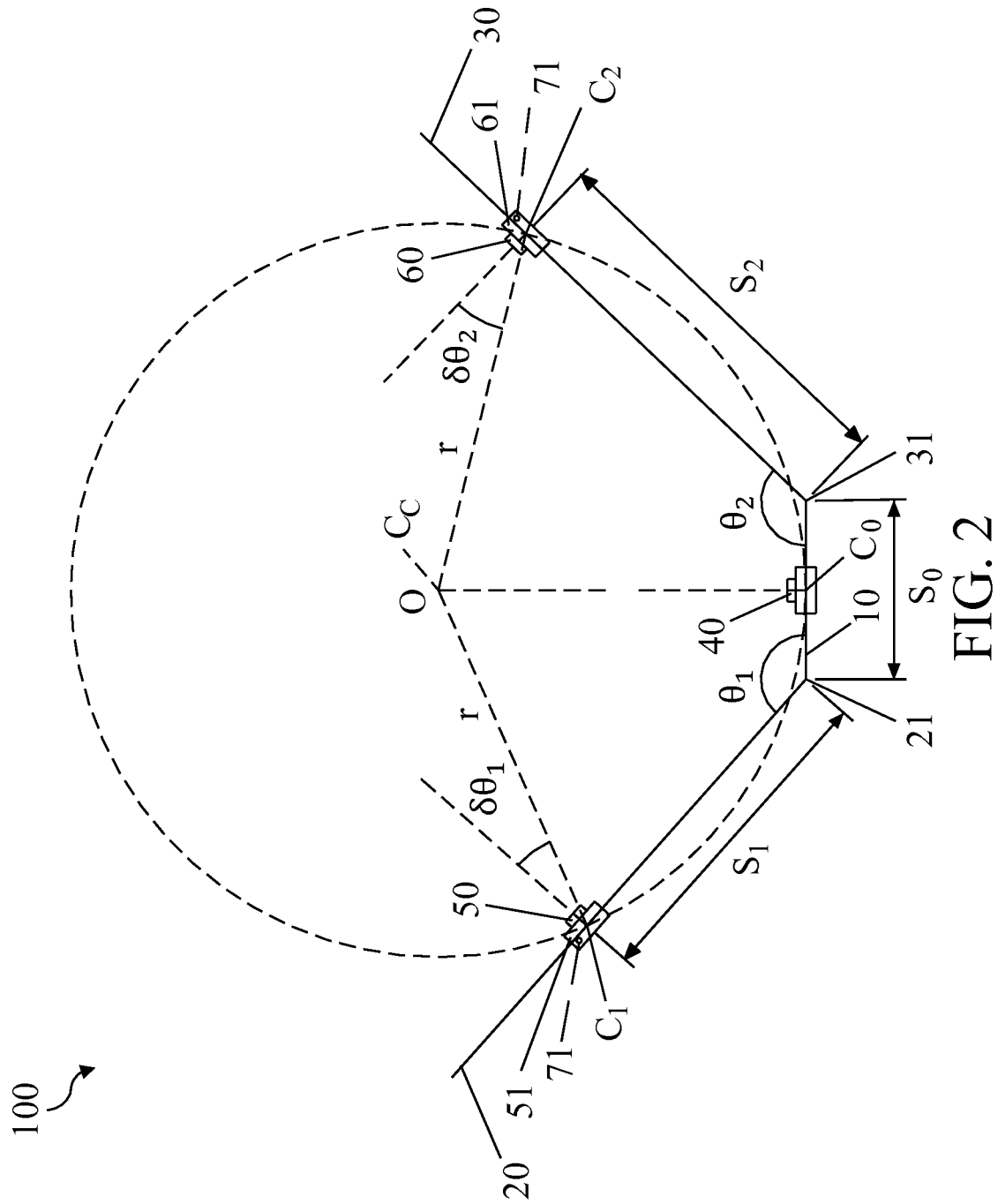
FIG. 2 is a schematic diagram of a planar architecture of a concentric circle adjusting apparatus for a multiple image capturing device according to the present invention.

In the following, a concentric circle adjusting apparatus for a multiple image capturing device according to the present invention is described, which is proceeded with simultaneous reference to FIG. 2, in which a schematic diagram of a planar architecture of a concentric circle adjusting apparatus for a multiple image capturing device according to the present invention is shown.

The concentric circle adjusting apparatus 100 for a multiple image capturing device according to the present invention comprises a standard link 10, a first moving link 20, a second moving link 30, a standard image capturing device 40, a first image capturing device 50, a second image capturing device 60, a plurality of measuring units 71, and a control device 80. The control device 80 comprises a receiving module 81, a calculating module 82, a command generating module 83, and a transmitting module 84.

The first moving link 20 is pivotally connected to a first end of the standard link 10, i.e. the first moving link 20 may rotate with respect to the standard link 10. The second moving link 30 is pivotally connected to a second end of the standard link 10, i.e. the second moving link 20 may rotate with respect to the standard link 10. The standard link 10, the first moving link 20, and the second moving link 30 may be made of a metallic material, such as iron, iron alloy, copper, copper alloy, aluminum, aluminum alloy, etc, or a polymer material, such as epoxy resin, urea formaldehyde resin(UF), polyethylene(PE), polypropylene(PP) and polyvinyl chloride (PVC), etc. However, these are merely examples without limiting the present invention. Furthermore, marking points may be added on the first and second moving links 20, 30. Additionally, a central portion of the standard link 10 may be further fixed by a supporting frame, which is used to support the concentric circle apparatus 100 for the multiple image capturing device.

The standard image capturing device 40 is threaded to the central portion of the standard link 10. However, this is merely an example without limiting the present invention. Any means which may fix the standard image capturing device 40 onto the central portion of the standard link 10, such as welding and snap fitting, is deemed as within the scope of the present invention.

The first image capturing device 50 is disposed on the first moving link 20 through a first platform 51. Via the first platform 51, the first image capturing device 50 may move along the first moving link 20 to have a straight-line movement. Besides, the first platform 51 may further provide the first image capturing device 50 rotates with respect to the first platform 51. Additionally, the first image capturing device 50 may rotate with respect to the first platform 51 with an angle between 90 degrees and −90 degrees.

The second image capturing device 60 is disposed on the first moving link 30 through a second platform 51. Via the first platform 61, the first image capturing device 60 may move along the second moving link 30 to have a straight-line movement. Besides, the second platform 61 may further provide the second image capturing device 60 rotates with respect to the second platform 61. Additionally, the second image capturing device 60 may rotate with respect to the second platform 61 with an angle between 90 degrees and −90 degrees.

Figure 3:
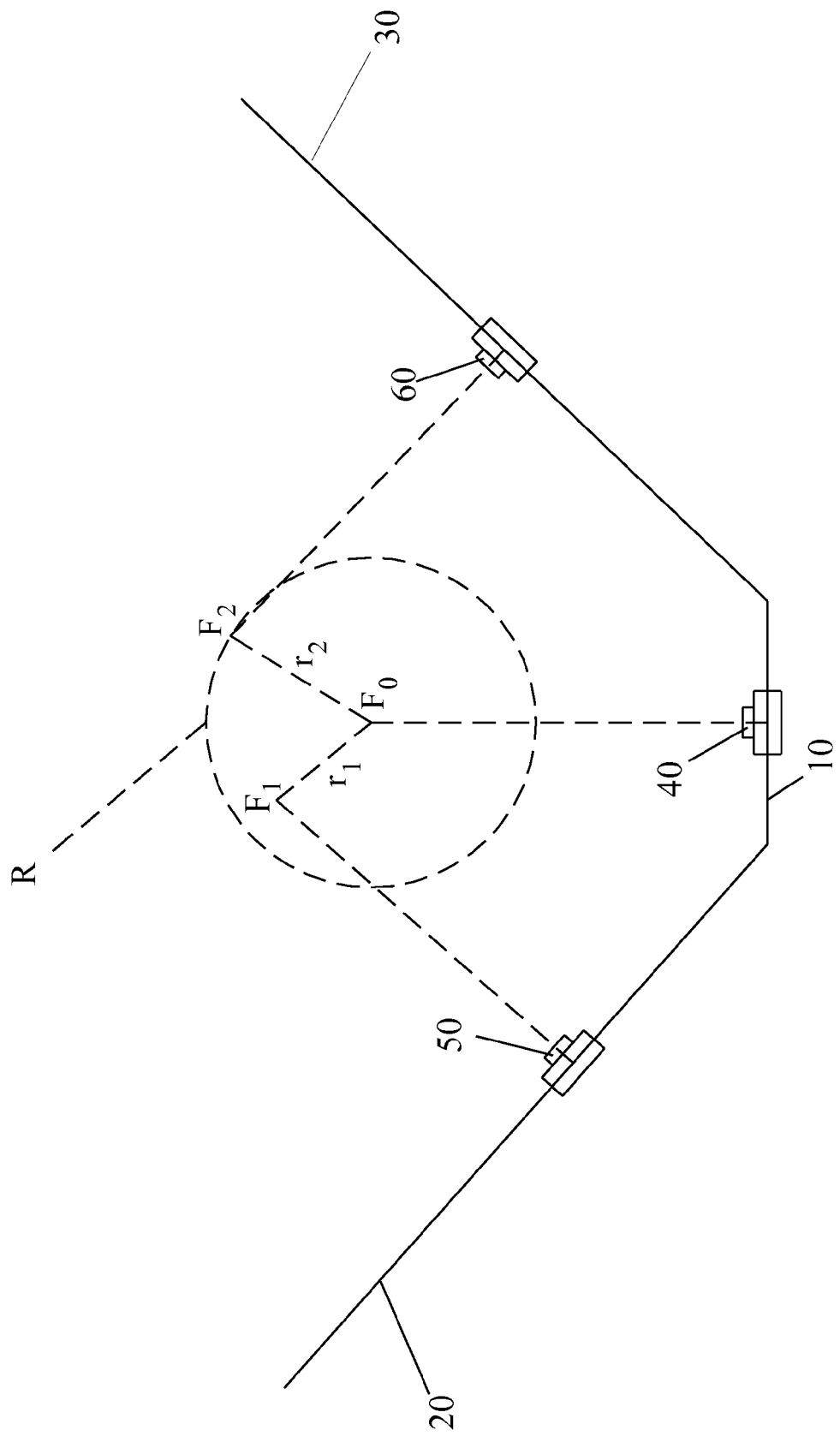
FIG. 3 is a planar schematic diagram of the concentric circle adjusting apparatus for the multiple image capturing device according to the present invention.

Referring to FIG. 3, a planar schematic diagram of the concentric circle adjusting apparatus for the multiple image capturing device according to the present invention is shown.

In the case that the first and second image capturing devices 50,60 have not been adjusted, a measure range R may be found according to a focal point $F_0$ of the standard image capturing device 40, a focal point $F_1$ of the first image capturing device 50, and a focal point $F_2$ of the second image capturing device 60. And, it is considered that an article's measurement may be clearly performed within the measure range R. The measure range R has a circle center of the focal point $F_0$ of the standard image capturing device 40. A distance $r_1$ between the focal point $F_0$ to the focal point $F_1$ is calculated, and a distance $r_2$ between the focal point $F_0$ to the focal point $F_2$ is calculated. Further, a larger one between the distances $r_1$ and $r_2$ is taken as a radius of the measure range. And, a front scene depth and a rear scene depth area of the standard image capturing device 40, the first image capturing area 50, and the second image capturing device 60 are respectively defined. The front scene depth area is defined as a diameter parallel to the standard image capturing device 40, the first image capturing device 50 or the second image capturing device 60 in the measure range R. A semi-circle range near the standard image capturing device 40, the first image capturing device 50 or the second image capturing device 60 is the front scene depth area. Relatively, the other semi-circle range farer from the standard image capturing device 40, the first image capturing device 50 or the second image capturing device 60 is the rear scene depth area. Based on this definition, the measurement task is conducted.

Figure 4A:
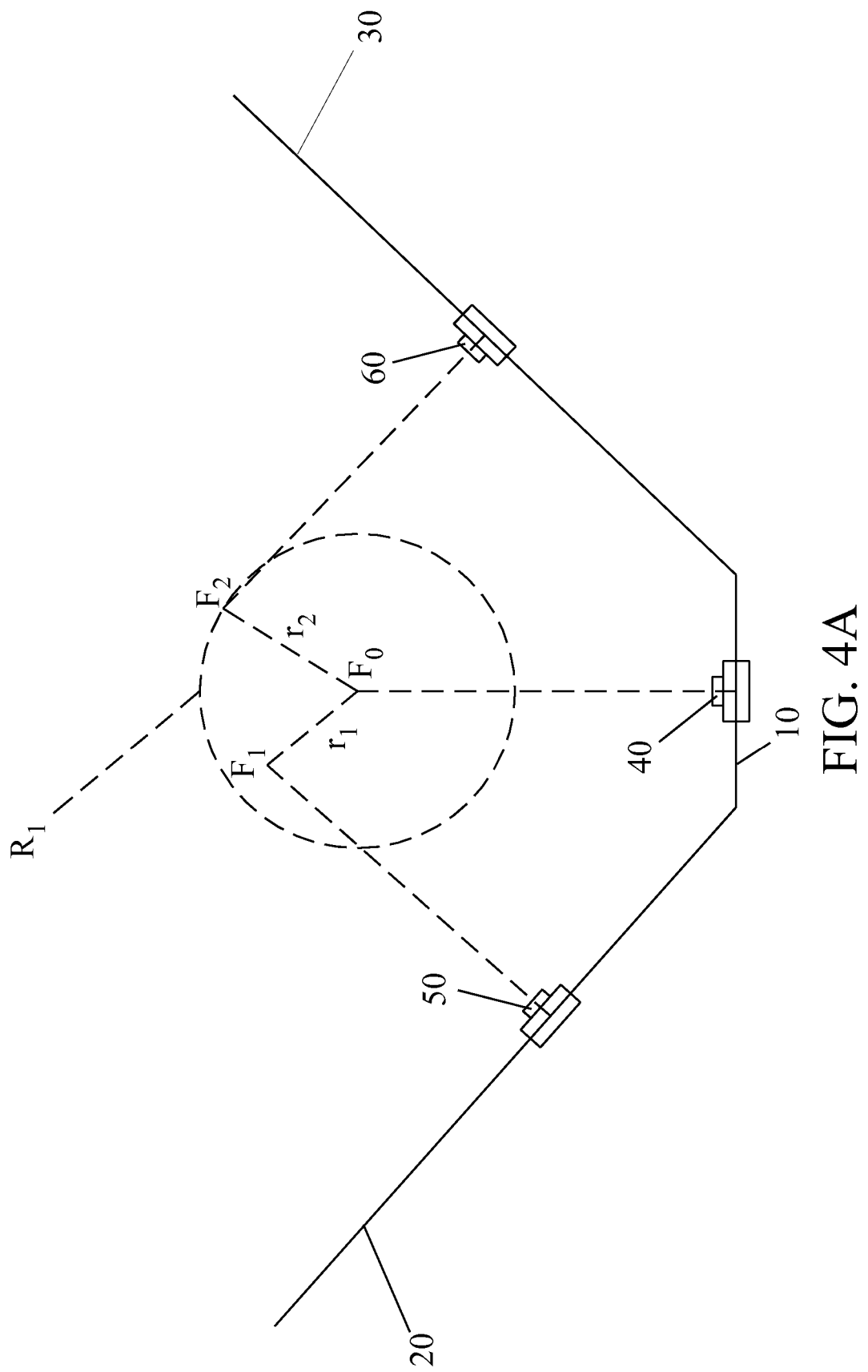
FIG. 4A through FIG. 4C are planar schematic diagrams of varied measure ranges of the concentric circle adjusting apparatus for the multiple image capturing device according to the present invention.
Figure 4B:
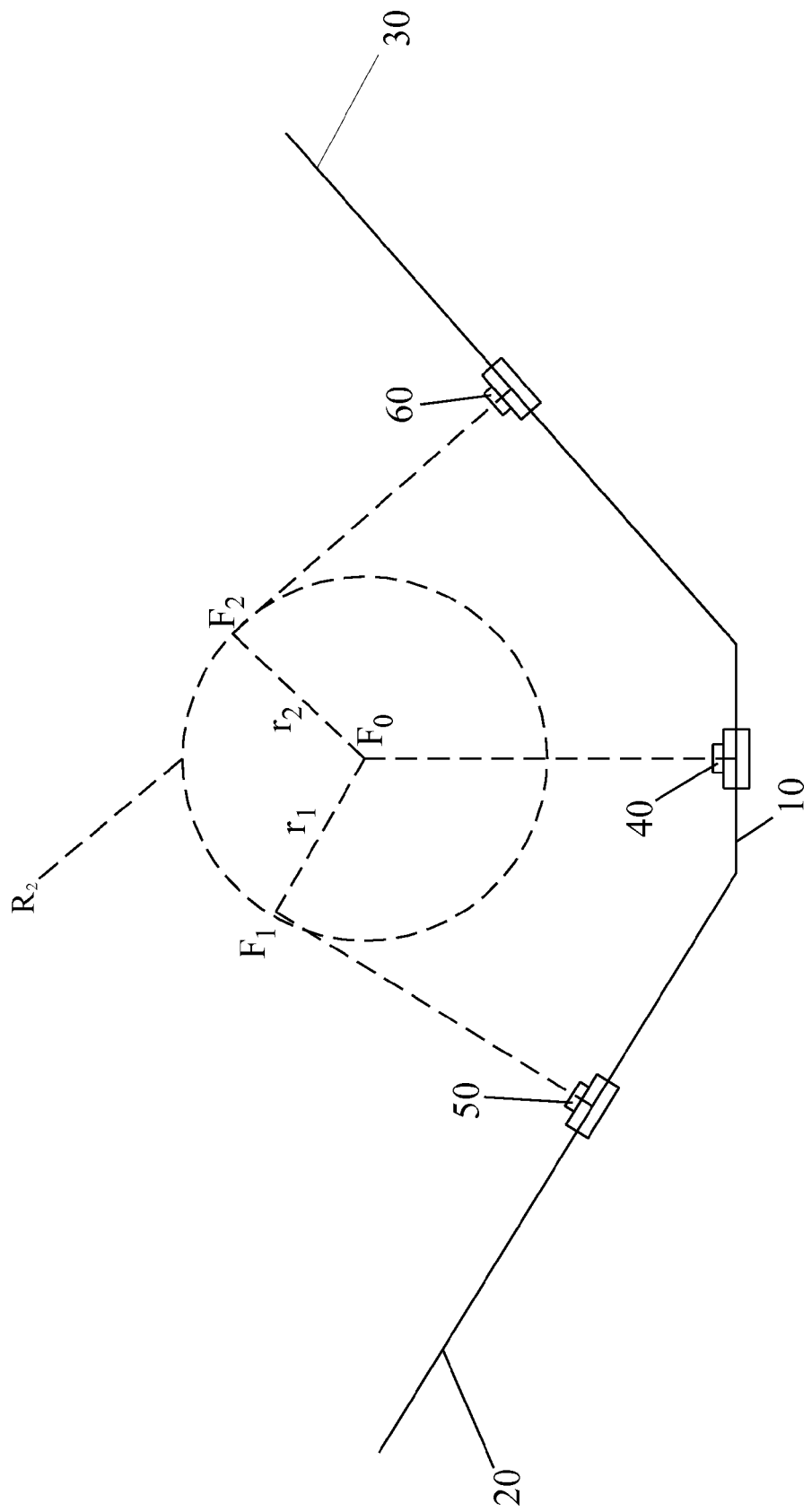
Figure 4C:
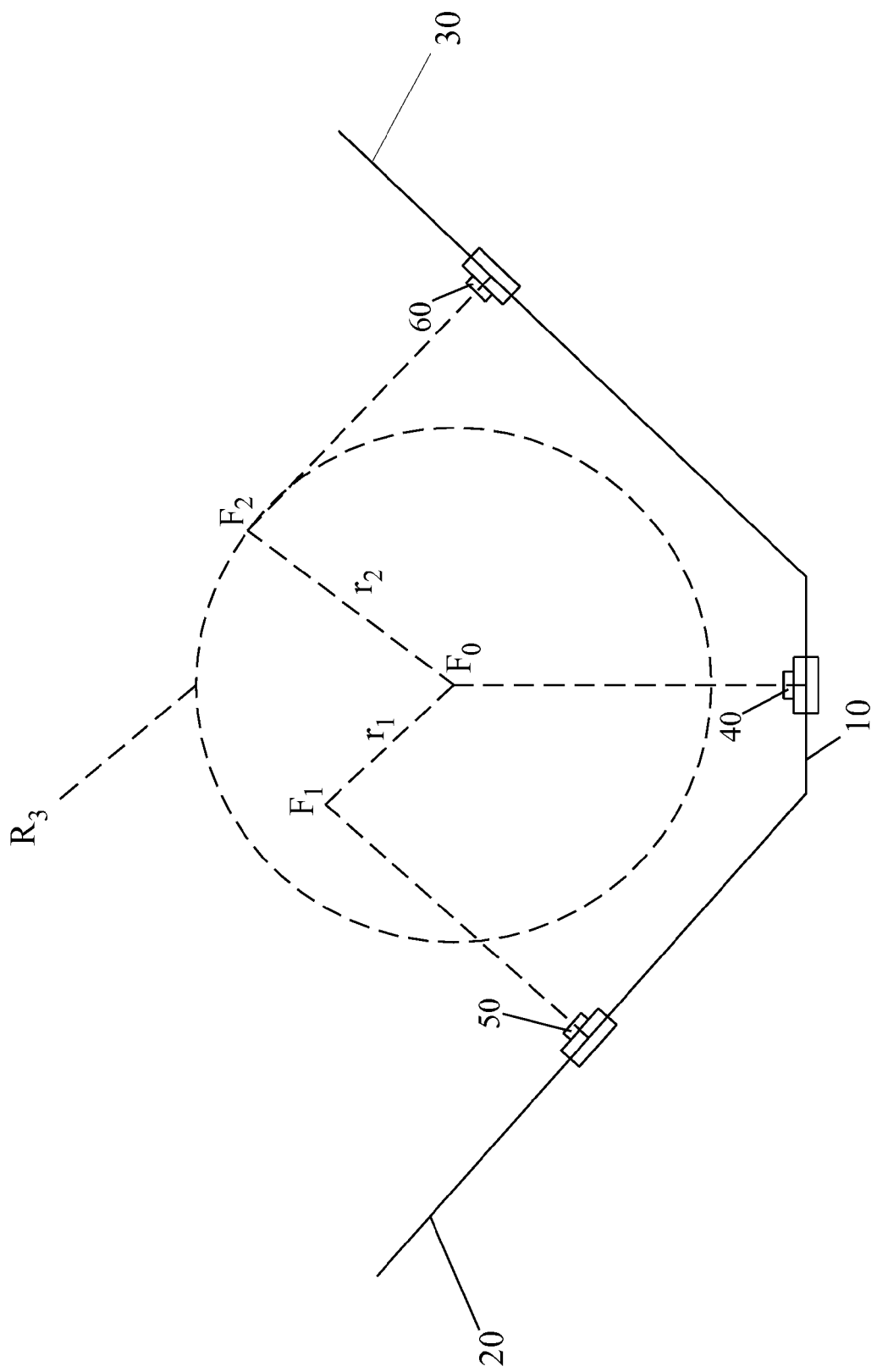

Thereafter, referring to FIG. 4A through FIG. 4C, planar schematic diagrams of varied measure ranges of the concentric circle adjusting apparatus for a multiple image capturing device according to the present invention are shown therein.

According to the above description, the calculated measure range $R_1$ is shown as FIG. 4A. When the first and second moving links 20,30 are rotated while the first and second image capturing devices 50,60 are maintained stationary, the calculated measure range is shown as FIG. 4B according again to the above description. It may be readily known that the measure range $R_2$ is significantly larger than the measure range $R_1$. Hence, although this policy may be conducted for the measurement, the issue that there is an exceedingly large error when different measure ranges are relied upon in the measurement still exists.

According to the above description, the calculated measure range $R_1$ is shown as FIG. 4A. When the first and second image capturing devices 50,60 are moved while the first and second moving links 20,30 are maintained stationary, the calculated measure range is shown as FIG. 4C according again to the above description. It may be readily known that the measure range $R_3$ is significantly larger than the measure range $R_1$. Hence, although this policy may be conducted for the measurement, the issue that there is an exceedingly large error when different measure ranges are relied upon in the measurement still exists.

Figure 5:
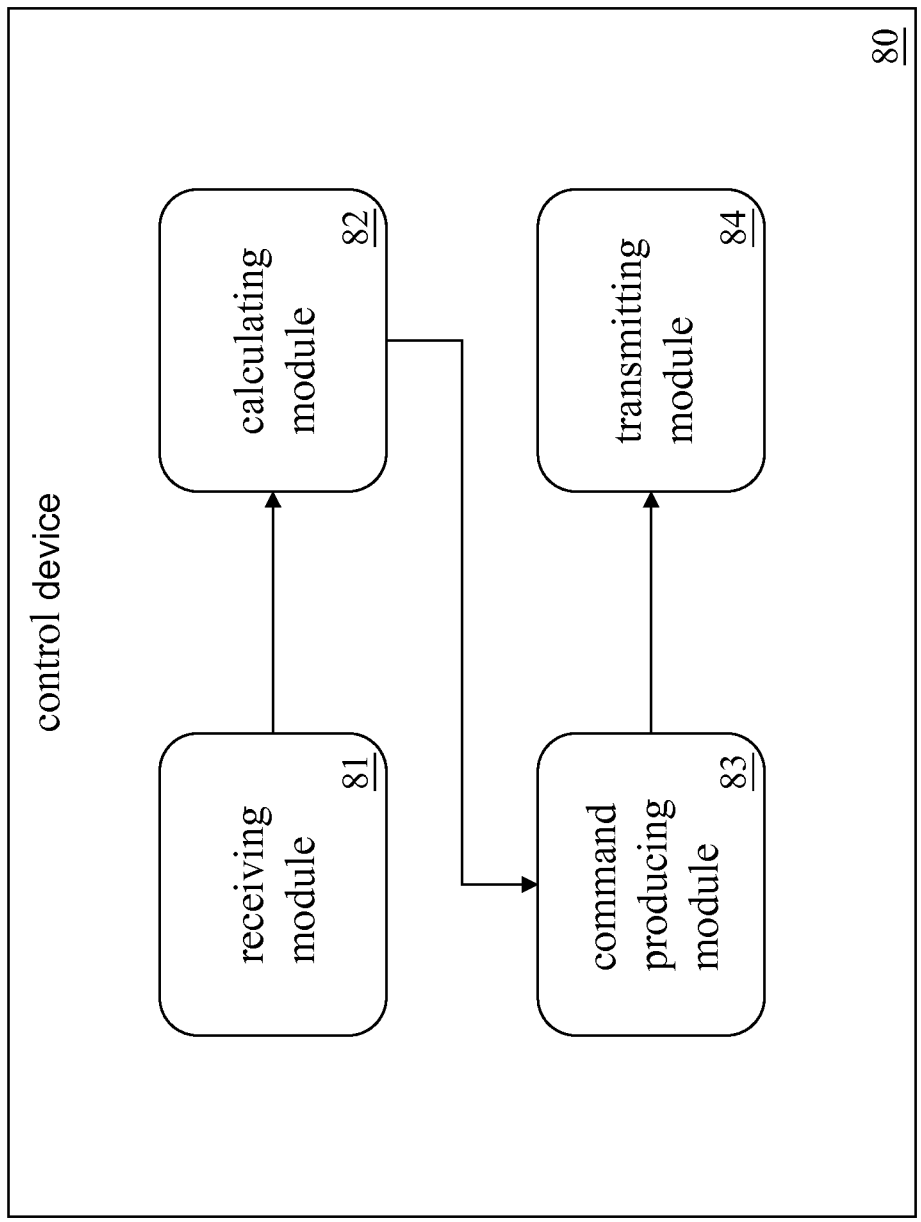
FIG. 5 is a device block diagram of a control device of the concentric circle adjusting apparatus for the multiple image capturing device according to the present invention.

Therefore, to perform a precise measurement, the first and second image capturing devices 50,60 have to be rotated for adjustment, so that the exceedingly large error issue may be soothed. Thereafter, referring to FIG. 2 and FIG. 5 simultaneously, a device block diagram of a control device of the concentric circle adjusting apparatus for the multiple image capturing device according to the present invention is shown in FIG. 5.

The plurality of measuring units 71 are disposed at a proper position of the first pivot 21, the second pivot 31, the first platform 51, and the second platform 61, respectively. The measuring unit 71 disposed at the proper position of the first pivot 21 is used to measure a first angle $\theta_1$ between the first moving link 20 and the standard link 10, while the measuring unit 71 disposed at the proper position of the first pivot 31 is used to measure a first angle $\theta_2$ between the second moving link 30 and the standard link 10.

The measuring unit 71 disposed at the proper position of the first platform 51 is used to measure a first distance $S_1$ between the first moving link 20 and the first pivot 21. The position of the first image capturing device 50 on the first moving link 20 is the position of the first platform 51 on the first moving link 20, and thus may be measured by the measuring unit 71 disposed at the proper position of the first platform 51.

The measuring unit 71 disposed at the proper position of the second platform 61 is used to measure a second distance $S_2$ between the position of the second image capturing device 60 on the second moving link 30 and the second pivot 31. The position of the second image capturing device 60 on the second moving link 60 is the position of the second platform 61 on the second moving link 30, and thus may be measured by the measuring unit 71 disposed at the proper position of the second platform 61.

The control device 80 is communicatively connected to the measuring unit 71 disposed at the proper position of the first pivot 21, the measuring unit 71 disposed at the proper position of the second pivot 31, the measuring unit 71 disposed at the proper position of the first platform 51, and the measuring unit 71 disposed at the proper position of the second platform 61, respectively. The control device 80 is communicatively connected to each of the measuring units 71 by a cable manner or a wireless manner. The cable manner may include a transmission wire manner, a cable network manner, etc, while the wireless manner may include a wireless network, bluetooth, Wi-Fi, etc. However, these are merely examples without limiting the present invention.

At the control device 80, the receiving module 81 may acquire the first angle $\theta_1$ from the measuring unit 71 disposed at the first pivot 21, the second angle $\theta_2$ from the measuring unit 71 disposed at the second pivot 31, the first distance $S_1$ from the measuring unit 71 disposed at the first platform 51, the second distance $S_2$ from the measuring unit 71 disposed at the second position 61.

Thereafter, the calculating module 82 at the control device 80 may calculate a first correction angle $\delta\theta_1$ for correcting the first image capturing device 50 and a second correction angle $\delta\theta_2$ for correcting the second image capturing device 60. The first and second correction angles $\delta\theta_1$ and $\delta\theta_2$ are set forth to enable the standard, first, and second image capturing devices 40, 50, 60 to present a concentric circle arrangement, and a central optical axis of the standard, first, and second image capturing devices 40, 50, 60 cross at a concentric circle O. The calculations for the rotation correction for the first image capturing device 50 and the rotation correction for the second image capturing device 60, the first correction angle $\delta\theta_1$, and the second correction angle $\delta\theta_2$ are described as follows.

First, a coordination value $C_0$ of the standard image capturing device 40 is defined as follows:

$$C_0(0,0) \equiv (x_0, y_0)$$

According to a link length $S_0$ of the standard link 10, the first angle $\theta_1$ and the first distance $S_1$, a coordination value $C_1$ of the first image capturing device 50 may be calculated as follows:

$$C_1\left(-\frac{S_0}{2} - S_1\cos\theta_1, S_1\sin\theta_1\right) \equiv (x_1, y_1)$$

According to a link length $S_0$ of the standard link 10, the second angle $\theta_2$ and the second distance $S_2$, a coordination value $S_2$ of the second image capturing device 60 may be calculated as follows:

$$C_2\left(\frac{S_0}{2} - S_2\cos\theta_2, S_2\sin\theta_2\right) \equiv (x_2, y_2)$$

Further, a coordination value $C_C \equiv (x_C, y_C)$ of the concentric circle O may be calculated as, and a diameter r of the concentric circle as:

$$x_C = \frac{1}{x_1 y_2 - x_2 y_1}\left[\left(\frac{x_1^2 + y_1^2}{2}\right)y_2 - \left(\frac{x_2^2 + y_2^2}{2}\right)y_1\right]$$

$$y_C = \frac{1}{x_2 y_1 - x_1 y_2}\left[\left(\frac{x_1^2 + y_1^2}{2}\right)x_2 - \left(\frac{x_2^2 + y_2^2}{2}\right)x_1\right]$$

$$r = \sqrt{x_C^2 + y_C^2}$$

If $x_1 + x_2 = 0$ and $y_1 + y_2 = y$, that $|x_1| = x_2 = x$, then:

$$x_C = \frac{1}{2xy} \cdot 0 = 0$$

$$y_C = \frac{1}{2xy} \cdot 2x \frac{x^2 + y^2}{2} = \frac{x^2 + y^2}{2y}$$

$$r = y_C = \frac{x^2 + y^2}{2y}$$

According to the above calculations, the concentric circle center O crossed by the standard, first and second image capturing devices 40, 50, 60 may be obtained with a general formula:

$$x_C = \frac{1}{x_1 y_2 - x_2 y_1}\left[\left(\frac{x_1^2 + y_1^2}{2}\right)y_2 - \left(\frac{x_2^2 + y_2^2}{2}\right)y_1\right]$$

$$y_C = \frac{1}{x_2 y_1 - x_1 y_2}\left[\left(\frac{x_1^2 + y_1^2}{2}\right)x_2 - \left(\frac{x_2^2 + y_2^2}{2}\right)x_1\right]$$

$$r = \sqrt{x_C^2 + y_C^2}$$

Thereafter, the first correction angle $\delta\theta_1$ is calculated as follows:

A vector presenting the first image capturing device 50 to the standard image capturing device 40:

$$\vec{V}_1 \equiv [y_1 - y_0, x_0 - x_1]$$

A vector presenting the first image capturing device 50 to the concentric circle center O:

$$\vec{V}_{C1} \equiv [x_C - x_1, y_C - y_1]$$

$$\cos\delta\theta_1 = \frac{\vec{V}_1 \cdot \vec{V}_{C1}}{|\vec{V}_1| \cdot |\vec{V}_{C1}|}$$

$$\cos\delta\theta_1 = \frac{(y_1 - y_0) \cdot (x_C - x_1) + (x_0 + x_1) \cdot (y_C - y_1)}{\sqrt{(y_1 - y_0)^2 + (x_0 - x_1)^2}\sqrt{(x_C - x_1)^2 + (y_C - y_1)^2}}$$

$$\cos\delta\theta_1 = \frac{x_C(y_1 - y_0) + y_C(x_0 - x_1) + (x_1 y_0 - x_0 y_1)}{\sqrt{(y_1 - y_0)^2 + (x_0 - x_1)^2}\sqrt{(x_C - x_1)^2 + (y_C - y_1)^2}}$$

$$\delta\theta_1 = \cos^{-1}\left[\frac{x_C(y_1 - y_0) + y_C(x_0 - x_1) + (x_1 y_0 - x_0 y_1)}{\sqrt{(y_1 - y_0)^2 + (x_0 - x_1)^2}\sqrt{(x_C - x_1)^2 + (y_C - y_1)^2}}\right]$$

Substituting $x_0 = 0$ and $y_0 = 0$ into the above equation, it may be obtained that:

$$\delta\theta_1 = \cos^{-1}\left[\frac{x_C y_1 - y_C x_1}{\sqrt{(x_C - x_1)^2 + (y_C - y_1)^2}\sqrt{x_1^2 + y_1^2}}\right]$$

Further, $x_C = 0$, $y_C = x^2 + y^2/2y$, $x_1 = -x$ and $y_1 = y$ are substituted into the above equation, it may be obtained that:

$$\delta\theta_1 = \cos^{-1}\left[\frac{1}{\sqrt{x^2 + y^2}}\right]$$

$$\delta\theta_1 = \cos^{-1}\left[\frac{1}{\sqrt{\frac{S_0^2}{4} + S_1 S_0 \cos\theta_1 + S_1^2}}\right]$$

$$\delta\theta_1 = \cos^{-1}\left[\frac{\sqrt{x^2 + y^2}}{x^2 + y^2}\right]$$

When the first and second image capturing devices 50,60 arrange symmetrically:

$$\delta\theta_1 = \cos^{-1}\left[\frac{1}{\sqrt{x^2+y^2}}\right]$$

Thereafter, the second correction angle $\delta\theta_2$ is calculated as follows:

A vector presenting the second image capturing device 60 to the standard image capturing device:

$$\vec{V}_2 = [y_2 - y_0, x_0 - x_2]$$

A vector presenting the second image capturing device 60 to the concentric circle center O:

$$\vec{V_{C2}} \equiv [x_C - x_2, y_C - y_2]$$

$$\cos\delta\theta_2 = \frac{\vec{V_2} \cdot \vec{V_{C2}}}{|\vec{V_2}| \cdot |\vec{V_{C2}}|}$$

$$\cos\delta\theta_2 = \frac{(y_2 - y_0) \cdot (x_C - x_2) + (x_0 + x_2) \cdot (y_C - y_2)}{\sqrt{(y_2 - y_0)^2 + (x_0 - x_2)^2} \sqrt{(x_C - x_2)^2 + (y_C - y_2)^2}}$$

$$\cos\delta\theta_2 = \frac{x_C(y_2 - y_0) + y_C(x_0 - x_2) + (x_2 y_0 - x_0 y_2)}{\sqrt{(y_2 - y_0)^2 + (x_0 - x_2)^2} \sqrt{(x_C - x_2)^2 + (y_C - y_2)^2}}$$

$$\delta\theta_2 = \cos^{-1}\left[\frac{x_C(y_2 - y_0) + y_C(x_0 - x_2) + (x_2 y_0 - x_0 y_2)}{\sqrt{(y_2 - y_0)^2 + (x_0 - x_2)^2} \sqrt{(x_C - x_2)^2 + (y_C - y_2)^2}}\right]$$

Substituting $x_0=0$ and $y_0=0$ into the above equation, it may be obtained that:

$$\delta\theta_2 = \cos^{-1}\left[\frac{x_C y_2 - y_C x_2}{\sqrt{(x_C - x_2)^2 + (y_C - y_2)^2} \sqrt{x_2^2 + y_2^2}}\right]$$

Further, $$x_C = 0, \; y_C = \frac{x^2 + y^2}{2y}, \; x_2 = x \text{ and } y_2 = y$$

are substituted into the above equation, it may be obtained that:

$$\delta\theta_2 = \cos^{-1}\left[\frac{1}{\sqrt{x^2+y^2}}\right]$$

$$\delta\theta_2 = \cos^{-1}\left[\frac{1}{\sqrt{\frac{S_0^2}{4} + S_2 S_0 \cos\theta_2 + S_2^2}}\right]$$

$$\delta\theta_2 = \cos^{-1}\left[\frac{\sqrt{x^2+y^2}}{x^2+y^2}\right]$$

When the first image capturing device 50 and the second image capturing device 60 arrange symmetrically:

$$\delta\theta_2 = \cos^{-1}\left[\frac{1}{\sqrt{x^2+y^2}}\right]$$

According to the above description, the calculation module 82 at the control device 80 may calculate the first and second correction angles $\delta\theta_1$ and $\delta\theta_2$ according to the link length $S_0$, the first angle $\theta_1$, the second angle $\theta_2$, the first distance $S_1$, and the second distance $S_2$, respectively.

After the first and second correction angles $\delta\theta_1$ and $\delta\theta_2$ are calculated by the calculating module 82 at the control device 80, the command generating module 83 at the control device 80 generates a first control command corresponding to the first correction angle $\delta\theta_1$ and a second control command corresponding to the second correction angle $\delta\theta_2$.

Finally, the transmitting module 84 at the control device 80 issues a first control command to the first platform 51, and a second control command to the second platform 61. When the first control command is received at the first platform 51, the first platform 51 is controlled according to the first control command to rotate the first image capturing device 50 by the first correction angle $\delta\theta_1$. When the second control command is received at the second platform 61, the second platform 61 is controlled according to the second control command to rotate the second image capturing device 60 by the first correction angle $\delta\theta_2$, so that the standard image capturing device 40, the first image capturing device 50 and the second image capturing device 60 present in a concentric circle arrangement, and a central optical axis of the standard image capturing device 40, the first image capturing device 50 and the second image capturing device 60 cross at a circle center of a concentric circle O.

In view of the above, the apparatus of the present invention has the difference as compared to the prior art that the first moving link is pivotally connected to the first end of the standard link through the first pivot, the second moving link is pivotally connected to the second end of the standard link through the second pivot, the standard image capturing device is fixed at the central position of the standard link, the first image capturing device is disposed on the first moving link through the first platform, the second image capturing device is disposed on the second moving link through the second platform, the first and second correction angles for correcting the first and second image capturing devices are respectively calculated by the control device according to the link length of the standard link, the first angle, the second angle, the first distance, and the second distance, respectively, so that the first and second platforms are controlled according to the first and second control commands to rotate the first and second image capturing device by the first and second correction angles, respectively, whereby the standard image capturing device, the first image capturing device and the second image capturing device present in the concentric circle arrangement, and the central optical axis of the standard image capturing device, the first image capturing device and the second image capturing device cross at a circle center of a concentric circle.

By using of the above technical means, the limited visible range and the incessant calibration issues of the image capturing devices encountered in the prior art may be effectively solved, and thus the efficacy of an increased visible range and a rapid calibration of the image capturing device may be well achieved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A concentric circle adjusting apparatus for a multiple image capturing device, comprising:
   a standard link;
   a first moving link, pivotally connected to a first end of the standard link through a first pivot;
   a second moving link, pivotally connected to a second end of the standard link through a second pivot;
   a standard image capturing device, fixed at a central position of the standard link;
   a first image capturing device, disposed on the first moving link through a first platform;
   a second image capturing device, disposed on the second moving link through a second platform;
   a plurality of measuring units, disposed at a proper position of the first pivot, the second pivot, the first platform and the second platform, respectively, to measure a first angle between the first moving link and the standard link, a second angle between the second moving link and the standard link, a first distance between a position of the first image capturing device at the first moving link and the first pivot, and a second distance between a position of the second image capturing device at the second moving link and the second pivot; and
   a controlling device, connected to the measuring units, the first platform and the second platform, respectively, and further comprising;
      a receiving module, receiving the first angle, the second angle, the first distance and the second distance from the measuring units, respectively;
      a calculation module, calculating a first correction angle for correcting the first image capturing device and a second correction angle for correcting the second image capturing device according to a length of the standard link, the first angle, the second angle, the first distance, and the second distance;
      a command generating module, generating a first control command according to the first correction angle, and generating a second control command according to the second correction angle; and
      a transmitting module, transmitting the first control command to the first platform, and transmitting the second control command to the second platform;
   wherein the first platform is controlled according to the first control command to enable the first image capturing device to rotate according to the first correction angle, and the second platform is controlled according to the second control command to enable the second image capturing device to rotate according to the second correction angle, so that a central optical axis of the standard image capturing device, the first image capturing device and the second image capturing device cross at a circle center of a concentric circle.

2. The concentric circle adjusting apparatus for a multiple image capturing device as claimed in claim 1, wherein the first platform enables the first image capturing device to move along the first moving link and to enable the first image capturing device to rotate.

3. The concentric circle adjusting apparatus for a multiple image capturing device as claimed in claim 1, wherein the second platform enables the second image capturing device to move along the second moving link and to enable the second image capturing device to rotate.

4. The concentric circle adjusting apparatus for a multiple image capturing device as claimed in claim 1, wherein the controlling device is communicatively connected to the measuring units, the first platform and the second platform, respectively, in a cable manner.

5. The concentric circle adjusting apparatus for a multiple image capturing device as claimed in claim 4, wherein the cable manner includes a transmission line and a cable network.

6. The concentric circle adjusting apparatus for a multiple image capturing device as claimed in claim 1, wherein the controlling device is communicatively connected to the measuring unit, the first platform, and the second platform, respectively, in a wireless manner.

7. The concentric circle adjusting apparatus for a multiple image capturing device as claimed in claim 6, wherein the wireless manner includes wireless network, Bluetooth, and Wi-Fi.

8. The concentric circle adjusting apparatus for a multiple image capturing device as claimed in claim 1, wherein the position of the first image capturing device at the first moving link is the position of the first platform at the first moving link.

9. The concentric circle adjusting apparatus for a multiple image capturing device as claimed in claim 1, wherein the position of the second image capturing device at the second moving link is the position of the second platform at the second moving link.

10. The concentric circle adjusting apparatus for a multiple image capturing device as claimed in claim 1, further comprising a supporting frame to which the standard link is fixed to the supporting frame at a center thereof, for supporting the concentric circle adjusting apparatus.

* * * * *